UNITED STATES PATENT OFFICE.

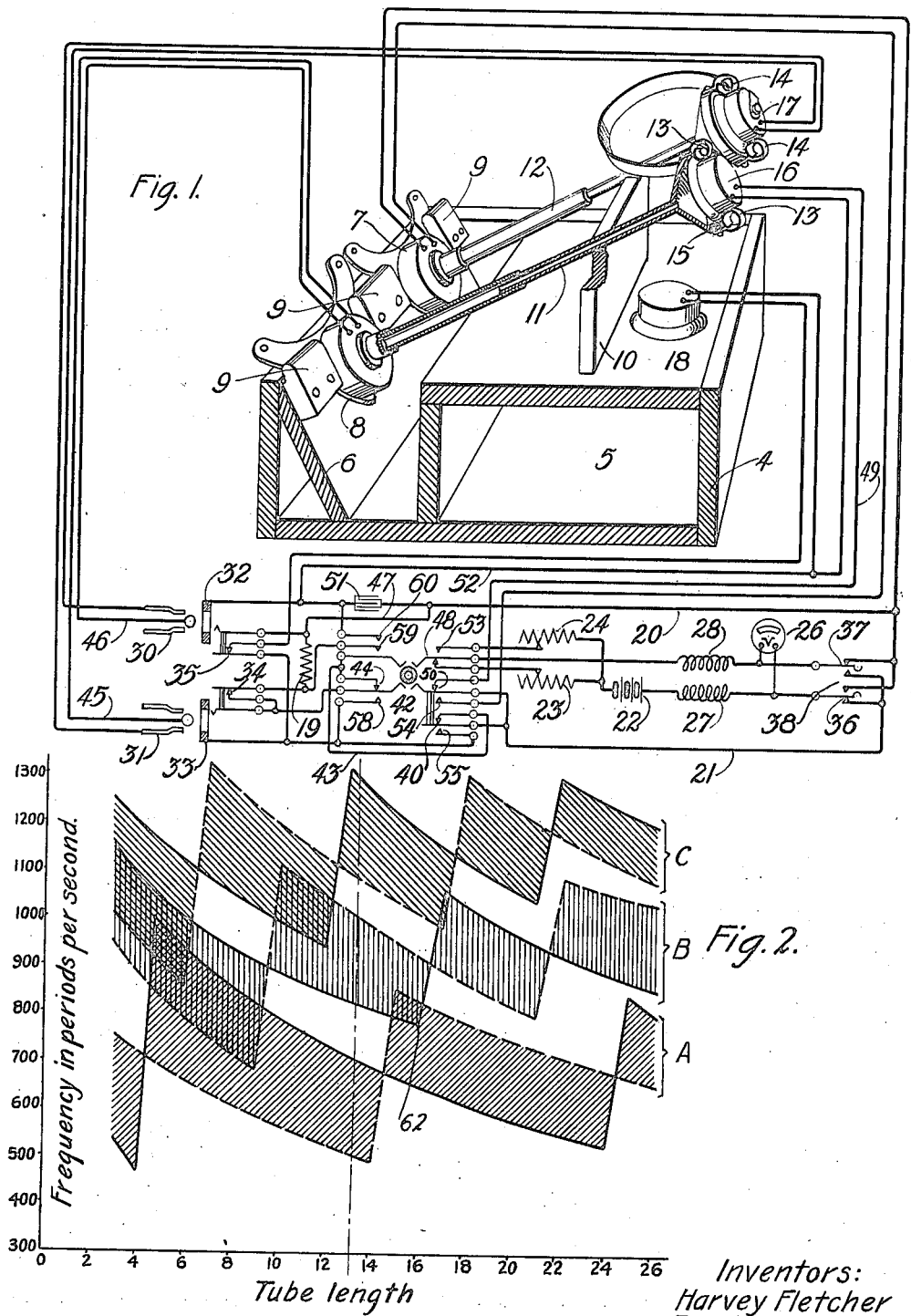

HARVEY FLETCHER, OF NEW YORK, N. Y., AND FRANK J. STRASSNER, OF NEWARK, NEW JERSEY, ASSIGNORS TO WESTERN ELECTRIC COMPANY, INCORPORATED, OF NEW YORK, N. Y., A CORPORATION OF NEW YORK.

TESTING APPARATUS.

1,386,697.  Specification of Letters Patent.  Patented Aug. 9, 1921.

Application filed July 14, 1920. Serial No. 396,115.

*To all whom it may concern:*

Be it known that we, HARVEY FLETCHER and FRANK J. STRASSNER, citizens of the United States, residing at New York, in the county of New York and State of New York, and at Newark, in the county of Essex and State of New Jersey, respectively, have invented certain new and useful Improvements in Testing Apparatus, of which the following is a full, clear, concise, and exact description.

This invention relates to new and useful improvements in testing apparatus. It has, therefore, as its object, the provision of a test set wherein transmitters and receivers may be efficiently and rapidly tested to determine both the transmission efficiency and quality of such instruments.

It has for years been well known that when a receiver and transmitter are connected electrically, with the receiver in close proximity to the mouth of the transmitter, a current is generated which produces a hum or singing tone. When the transmitter and receiver are separated by an inclosed air column, a tone of a definite pitch will be emitted and the potential difference measured across the terminals of the transmitter will vary in accordance with the agitation of the transmitter diaphragm.

In a series of experiments conducted by Messrs. Kennelly and Upson of Harvard University, a report of which may be found in the proceedings of the American Philosophical Society, volume 47, of May–August, 1908, No. 189, beginning on page 329, it was found that the efficiency of a receiver and transmitter coupled by an inclosed air column could be determined by measuring the value of the resistance necessary to be inserted in the electrical coupling to damp out the singing tone produced by the combination.

The present invention pertains to an improved method especially applicable to the commercial testing of such instruments whereby they may be rapidly tested in large quantities.

For accomplishing the above object, the invention provides a test set arranged to test rapidly and efficiently both transmitters and receivers. The test set is equipped with a pair of tubes or couplers each of which is designed to connect a transmitter with a receiver. In the preferred form of the invention, these tubes are of metal, but any other suitable composition of tube may be provided without departing from the spirit and scope of the invention. These tubes are positioned in the set in such a manner that the transmitter is held with the face upward at an angle of approximately 20° with the vertical. The purpose of this is to subject the instrument under test to substantially the same conditions as when it is actually in service. The transmitter that is desired to be tested is coupled by means of one of these tubes with a standard receiver. The receiver under test is likewise coupled with a standard transmitter. These various sets of instruments are also connected electrically by means of suitable circuit connections so that they are in a tone producing relation. In this way, transmitters and receivers are tested.

A better understanding of the invention may be had from the following description when considered in conjunction with the accompanying drawing, wherein Figure 1 shows the test set partly in section, together with the circuit connections employed, while Fig. 2 shows a series of curves representing the behavior of various transmitters of different characteristics.

In Fig. 1, there is shown a casing 4 having a compartment 5, wherein the circuit connections are adapted to be positioned. To one side of the casing 4 and on the inside thereof, a member 6 is secured. Upon this member 6 there is mounted a standard transmitter 7 which fulfils certain requirements both as to the transmission efficiency and quality. There is also positioned on the member 6, a second transmitter 8, the transmission efficiency and quality of which is to be determined. This member 6 is placed on a slant so that the conditions under which the transmitters are tested will more nearly simulate the conditions when they are actually in service. Although in this particular set, the transmitters are shown as being held in position by means of blocks 9, any other suitable means may be provided.

On the upper surface of the casing 4, there is secured a member 10 which stands vertically and upon which a pair of metal tubes 11 and 12 are positioned. One end of these tubes is formed in the shape of a cup for the purpose of receiving a receiver of any of the well known types. The other end of these tubes is straight and is adapted to be secured to the transmitter in the same manner as the mouth piece. In order that various tests may be performed, the tubes are made telescoping. In this way, the length of the tubes and the air column may be varied to alter thereby the conditions under which the transmitters and receivers are adapted to be tested.

The cup shaped ends of each of these tubes have inserted therein, a cushion of felt such as indicated at 15. This felt is provided for the purpose of making the connection between the receiver and the tube as nearly air-tight as possible. The receivers are adapted to be held in position in the cup shaped ends of each of the tubes by means of suitable clamping springs 13 and 14 respectively.

Associated with the tube 11 is a receiver 16 which is of the bi-polar type and is known to have a definite efficiency. The receiver shown in the drawing and designated by the numeral 17 is one which is to be tested. This receiver is coupled by means of the tube 12 with the transmitter 7, the transmission efficiency and quality of which has previously been determined. There is also provided an additional receiver 18, the purpose of which will be more clearly brought out in the description which is to follow.

A brief description of the apparatus having been given, it is thought that the invention will be more clearly understood from a description of the method employed in testing the instruments for which the set was designed.

In the first instance, let it be assumed that it is desired to test both the transmission efficiency and quality of a transmitter. This is accomplished by first adjusting the value of the current flow through a resistance 19 which is normally connected in bridge of the conductors 20 and 21 with which there is associated a battery 22. The value of the current through the resistance 19 is adjusted to give a deflection of the voltmeter 26 of 10 volts. This is accomplished by means of a variable resistance 23 connected in series with the battery 22. The resistance element 19 is chosen so that the resistance thereof is substantially the same as that of a standard transmitter while howling. In this way, a condition is pr - duced which more nearly simulates that of a test performed in the testing of a standard transmitter.

The current traversing the resistance 19 having been adjusted to give a predetermined reading on the voltmeter 26, plugs 30 and 31 may then be inserted into the jacks 32 and 33 respectively. The insertion of the plugs into these jacks which are a part of the test set, connect through the tip conductors thereof the transmitter 8 and through the sleeve conductors thereof the receiver 17, both of which are desired to be tested. It is, however, understood that it is impossible to test simultaneously both of these instruments. The key 42 is therefore provided, which is arranged to control the connection of the transmitter and receiver in circuit with the conductors 20 and 21. The circuit including the resistance 19 is broken at contact 34 upon the insertion of the plug 31 into jack 33 and is thereby disconnected therefrom as long as such a condition exists. Upon the insertion of plug 30 into the jack 32 the circuit including the receiver 18 is broken at contact 35.

After the transmitter 8 has been connected in circuit with conductors 20 and 21, through contacts of the respective plugs and jacks, and the receiver 16 has been positioned in the cup of tube 11, the test may be proceeded with. The connection of the receiver and transmitter in this manner and the passage of a current through the button of the transmitter (not shown) produces a hum or singing tone. The circuit including the transmitter may be traced from one terminal of the battery 22, the choke coil 27, contact 36 of key 38, conductor 21, contact 40 of key 42, conductor 43, contact 44, tip contacts of the jack 33 and the plug 31, conductor 45 transmitting button (not shown), conductor 46, tip contacts of plug 30 and jack 32, conductors 47 and 20; contact 37 of key 38, the choke coil 28, contact 48 of key 42 and the resistance element 23 to the other side of the battery 22. By tracing the circuit including the receiver 16 which extends from one terminal of the receiver, conductor 49, contacts 50, 40 of key 42, conductor 43, contact 44 of key 42, tip contacts of jack 33 and plug 31, conductor 45, transmitter button, (not shown), conductor 46, tip contacts of plug 30 and jack 32, conductor 47, condenser 51, conductor 52 to the other terminal of the receiver 16, it is seen that the receiver 16 is connected in parallel relation with the transmitter 8. The choke coils 27 and 28 are provided for the purpose of offering a high impedance to the alternating current that produces the howling effect, thereby preventing this current from passing through the battery 22 and the leads extending thereto. Direct current is, however, prevented from passing through the coils of the receiver due to the condenser 51 connected in the receiver circuit and thereby prevent the receiver from being injured due to the connection of the battery 22 in circuit therewith.

When the conditions above outlined exist, the combination produces a hum or singing tone, the pitch of which is controlled by the length of the tube or coupler connecting the two instruments. The pitch of the tone emitted may be easily determined by means of an oscillator or pitch pipe. It is, however, of such a nature that it can be readily detected by the ear and compared with the pitch of the tone produced by the combination under certain other conditions.

After the voltage indicated on the voltmeter and the pitch of the tone emitted by the transmitter and receiver when coupled in this manner, are noted, the electrical connections of the receiver are reversed by means of the key 38. This, as is seen, reverses the battery supply with respect to the receiver. Upon the reversal of the circuit connections of the receiver, the transmitter and receiver connected in this manner produce a different deflection of the voltmeter and a change in the pitch of the tone emitted.

In determining the transmission efficiency of the transmitter, the two readings of the voltmeter are taken into account, that is, the voltage taken across the transmitter terminals with the connections of the receiver normal, is compared with voltage with the connections reversed. The average of these two voltages has been found to be a measure of the transmission efficiency of the instrument under test as compared with a standard transmitter.

To test the quality of the instruments it is necessary to utilize a standard transmitter coupled with a standard receiver and note the change in the pitch of the hum or singing tone upon the reversal of the battery supply with respect to the receiver. Inasmuch as it has been found advantageous to have the pitch of the hum or singing tone increase upon the reversal of the battery supply with respect to the receiver, should the tone produced upon the reversal of the battery supply be of a lower pitch than before such reversal, the original electrical connections of the receiver must be reversed to thereby reverse the direction of current through the receiver. It is thus possible by comparing the change in the pitch of the tone emitted, with that of a transmitter and receiver of known transmission efficiency and quality when subjected to similar conditions, to determine the quality of such instruments. That is, if a transmitter of the above character is placed in a tone producing relation and upon the reversal of the battery supply with respect to the receiver a tone of increased pitch is emitted, a transmitter that responds in a similar manner is said to be in good quality, however, if the opposite effect is produced the instrument is said to be poor in quality.

It is thus seen from the above description that the test affords a practical and rapid method for effectively testing both the transmission efficiency and quality of a transmitter.

In testing the efficiency of the receiver, the receiver 18 is positioned in the cup shaped end of the tube 12 and is then in a tone producing relation with the standard transmitter 7. The key 42 is then thrown to the right which opens contacts 40, 48 and 50 and closes contacts 53, 54 and 55. With the plugs 30 and 31 withdrawn from their respective jacks, a circuit is completed upon the actuation of key 42 which includes the receiver 18 and the transmitter 7 with the source of battery 22. The current traversing the circuit including these elements is then adjusted by varying the resistance 24 to produce an average deflection of 10 volts of the voltmeter 26 when the battery supply is connected with the receiver as shown in the drawing, and upon the actuation of the key 38 which reverses the battery supply 22 with respect to the receiver. After the current has been adjusted to give such a deflection, the receiver 18 is then replaced by the receiver 17, the transmission efficiency of which is desired, and the plugs 30 and 31 inserted in their respective jacks. The electrical efficiency of this receiver 17 is thus determined in the same manner as that described in connection with the transmitter 8, that is, the average of the voltage across the terminals of the receiver under normal conditions and when the battery supply is reversed with respect to the receiver, is taken as a measure of the transmission efficiency of such receiver.

There is also provided means whereby the cord connecting the transmitter and receiver with the plugs may be tested for the purpose of testing for short or open circuits which may exist in the cord. In determining this, the key 42 is thrown to the left thereby opening contact 44 and closing contacts 58, 59 and 60. The opening of contact 44 disconnects the lead wire extending between the two sides of the key 42, while the closure of contacts 59 and 60 places the resistance element 19 in shunt of the condenser 51 thereby establishing a continuous path which permits the passage of direct current around the condenser 51. The closure of contact 58 connects the conductor 21 to which the battery 22 is connected with the tip conductor 45 of the plug 31. A circuit is thus established including the source of potential 22 and the conductors of the cord extending to the transmitter 8 and the receiver 17. By placing the receiver 17 to the ear, one may easily detect a short or open circuit which may be present in the cord circuit by noting whether any noise is produced in the receiver.

Referring now to Fig. 2, which shows a series of curves representing the behavior of various transmitters possessing different characteristics. These curves have been shown for the purpose of bringing out more clearly, the method of distinguishing transmitters which are considered good in quality and those that are poor in quality. In plotting these curves, the pitch of the tone produced in periods per second is plotted against the tube length in inches. Curve A represents the phenomenon of a "hollow" transmitter or one having a low natural period, curve B that of a standard or transmitter, while curve C represents that of a "sharp" transmitter or one having a high natural period. The solid line of these curves is determined by noting the change in the pitch of the tone emitted for various tube or coupler lengths with the battery supply connected with the receiver terminals in a certain relation. The broken line represents the change in the pitch of the tone emitted upon the reversal of the battery supply with respect to the receiver. From these curves it is seen that the behavior of the various transmitters may be compared with that of a standard transmitter as represented by the curve B.

In the preferred form of the invention, a tube length of approximately 13 inches is employed. This particular tube length was chosen since a tone is produced, the pitch of which was found to lie about half way between the breaking points of the tone produced by a standard transmitter. The numeral 62 designates one of these breaking points. It is also evident after an examination of these curves, that the curves representing a "hollow" and a "sharp" transmitter tend to occupy the area taken up by the curve representing a good transmitter as the quality more nearly becomes that of a good transmitter. It is also noted that at this tube length the pitch of the tone produced by a standard transmitter upon the reversal of the battery supply with respect to the receiver as indicated by the dotted line, increases. From this as a basis it is possible to determine readily the quality of various other instruments, that is, if upon the reversal of the battery supply with respect to the receiver, the pitch of the tone increases, the transmitter is said to be good in quality as compared with a standard transmitter, while if the pitch decreases, it is said to be poor in quality.

What is claimed is:

1. The method of comparatively testing the quality of a transmitter which consists in connecting such transmitter in a tone producing relation with a receiver of known transmission efficiency. separating such transmitter and receiver by an inclosed air column, and reversing the electrical circuit of such receiver, whereby the quality of such transmitter may be determined by the comparison of the pitch of the tone so produced with the pitch of the tone produced when a transmitter of known transmission efficiency and quality is subjected to similar conditions.

2. The method of comparatively testing the quality of a transmitter which consists in electrically connecting such transmitter in parallel relation with a receiver of known transmission efficiency, coupling such transmitter and receiver by a tube whereby they are in a tone producing relation, and reversing the electrical circuit of such receiver, whereby the quality of such transmitter may be determined by the comparison of the pitch of the tone so produced with the pitch of the tone produced when a transmitter of known transmission efficiency and quality is subjected to similar conditions.

3. The method of comparatively testing the quality of a transmitter which consists in connecting such transmitter in a tone producing relation with a receiver of known transmission efficiency, coupling such transmitter and receiver by a tube of approximately 13 inches, and reversing the electrical circuit of such receiver, whereby the quality of such transmitter may be determined by the comparison of the pitch of the tone so produced with the pitch of the tone produced when a transmitter of known transmission efficiency and quality is subjected to similar conditions.

4. The method of testing the quality of a transmitter which consists in connecting such transmitter in a tone producing relation with a receiver of a known transmission efficiency, separating such transmitter and receiver by an inclosed air column, and reversing the electrical circuit of such receiver whereby if a tone of an increased pitch is produced upon such reversal the instrument is said to be good in quality.

5. The method of testing the quality of a transmitter which consists in connecting such transmitter in a tone producing relation with a receiver of a known transmission efficiency, separating such transmitter and receiver by an inclosed air column, and reversing the electrical circuit of such receiver whereby if a tone of a lower pitch is produced upon such reversal the instrument is said to be poor in quality as compared with an instrument of known transmission efficiency and quality.

In witness whereof we hereunto subscribe our names this 2nd day of July, A. D. 1920.

HARVEY FLETCHER.
FRANK J. STRASSNER.